(12) United States Patent
Kim

(10) Patent No.: US 12,407,211 B2
(45) Date of Patent: Sep. 2, 2025

(54) ELECTRIC MOTOR OIL PUMP DEVICE

(71) Applicant: LG INNOTEK CO., LTD., Seoul (KR)

(72) Inventor: Sang Tae Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 335 days.

(21) Appl. No.: 18/011,980

(22) PCT Filed: Jun. 23, 2021

(86) PCT No.: PCT/KR2021/007887
§ 371 (c)(1),
(2) Date: Dec. 21, 2022

(87) PCT Pub. No.: WO2021/261911
PCT Pub. Date: Dec. 30, 2021

(65) Prior Publication Data
US 2023/0253853 A1  Aug. 10, 2023

(30) Foreign Application Priority Data

Jun. 23, 2020 (KR) .................. 10-2020-0076491
Jun. 29, 2020 (KR) .................. 10-2020-0079542

(51) Int. Cl.
*H02K 5/20* (2006.01)
*F04B 17/03* (2006.01)
(Continued)

(52) U.S. Cl.
CPC .............. *H02K 5/20* (2013.01); *F04B 17/03* (2013.01); *H02K 9/19* (2013.01); *H02K 9/193* (2013.01)

(58) Field of Classification Search
CPC .. H02K 5/20; H02K 1/32; H02K 9/19; H02K 9/193; H02K 9/197; H02K 9/20
(Continued)

(56) References Cited

U.S. PATENT DOCUMENTS 8,928,195 B2 * 1/2015 Ohashi .................... H02K 9/19
310/58
2002/0079764 A1 * 6/2002 Cook .................. F04C 29/0085
310/89
(Continued)

FOREIGN PATENT DOCUMENTS

JP  2001-268850  9/2001
JP  2015-109768  6/2015
(Continued)

OTHER PUBLICATIONS

JP2015109768A English Translation (Year: 2015).*
(Continued)

*Primary Examiner* — Oluseye Iwarere
*Assistant Examiner* — Nicholas Lee Setzer
(74) *Attorney, Agent, or Firm* — KED & ASSOCIATES, LLP

(57) ABSTRACT

The present invention may provide a motor including a housing including a motor part and a cover coupled to the housing and including a pump part, wherein the cover includes a first hole through which a first area in the cover communicates with a second area in the housing, the motor part includes a shaft passing through the first hole, a first flow path through which the first area communicates with the second area is formed in the shaft, a second flow path through which the first area communicates with the second area is formed between the shaft and the first hole, and an amount of a fluid introduced through the first flow path is greater than an amount of a fluid introduced through the second flow path for a predetermined time.

10 Claims, 12 Drawing Sheets

(51) Int. Cl.
  *H02K 9/19* (2006.01)
  *H02K 9/193* (2006.01)
(58) Field of Classification Search
  USPC .................................................... 310/54, 61
  See application file for complete search history.

(56) References Cited

U.S. PATENT DOCUMENTS

| | | | |
|---|---|---|---|
| 2006/0017334 A1* | 1/2006 | Gotmalm | H02K 9/197 |
| | | | 310/64 |
| 2019/0003488 A1 | 1/2019 | Stefanovic et al. | |
| 2019/0078571 A1 | 3/2019 | Dieckhaus et al. | |
| 2019/0195347 A1* | 6/2019 | Kataoka | F16H 57/0446 |
| 2019/0203723 A1* | 7/2019 | Laing | F04B 53/16 |
| 2021/0013752 A1* | 1/2021 | Futae | H02K 1/185 |
| 2023/0253853 A1* | 8/2023 | Kim | F04B 17/03 |
| | | | 310/59 |
| 2023/0378840 A1* | 11/2023 | Kim | H02K 7/003 |

FOREIGN PATENT DOCUMENTS

| | | | | |
|---|---|---|---|---|
| JP | 2015109768 A * | 6/2015 | | H02K 16/02 |
| JP | 2016-111723 | 6/2016 | | |
| KR | 10-2020-0034726 | 3/2020 | | |

OTHER PUBLICATIONS

International Search Report dated Sep. 30, 2021 issued in Application No. PCT/KR2021/007887.
Korean Office Action dated May 25, 2025 issued in Application No. 10-2020-0076491.

* cited by examiner

[FIG. 1]
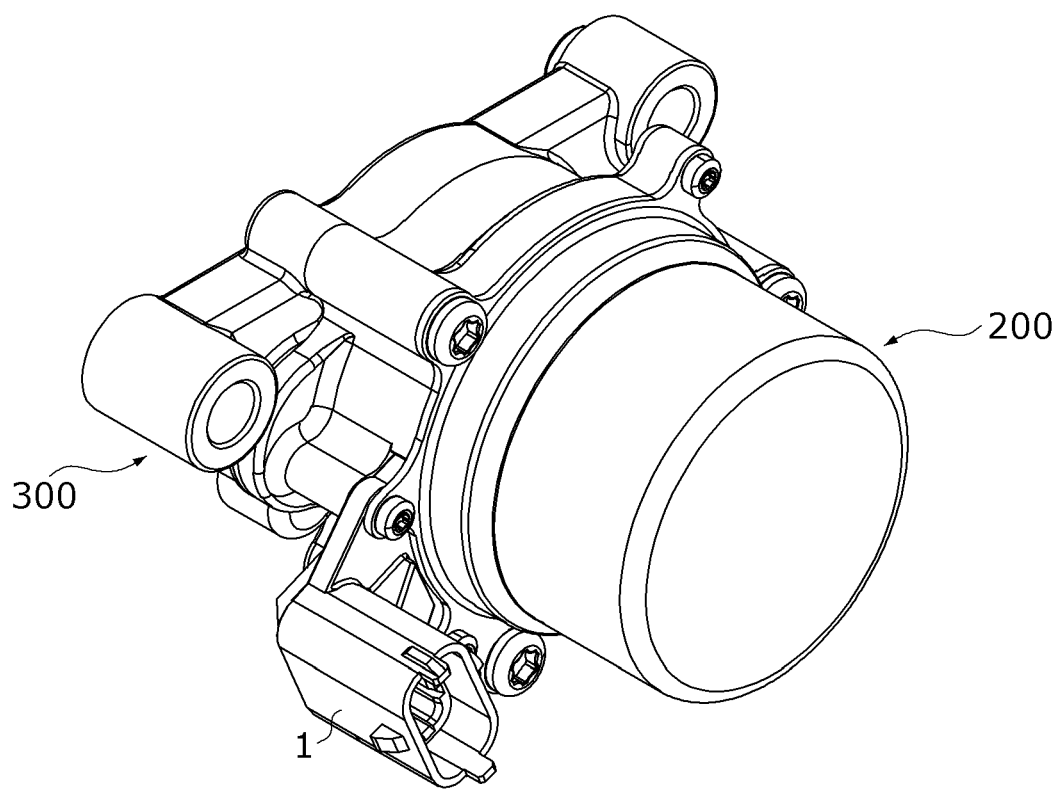

[FIG. 2]
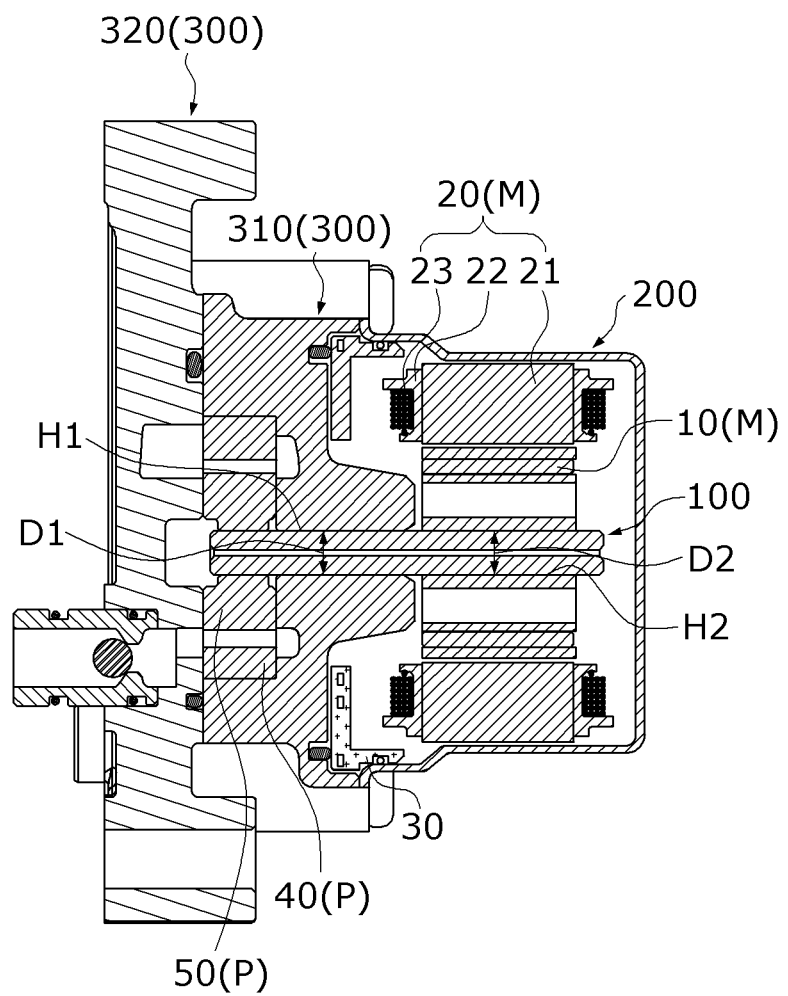

[FIG. 3]
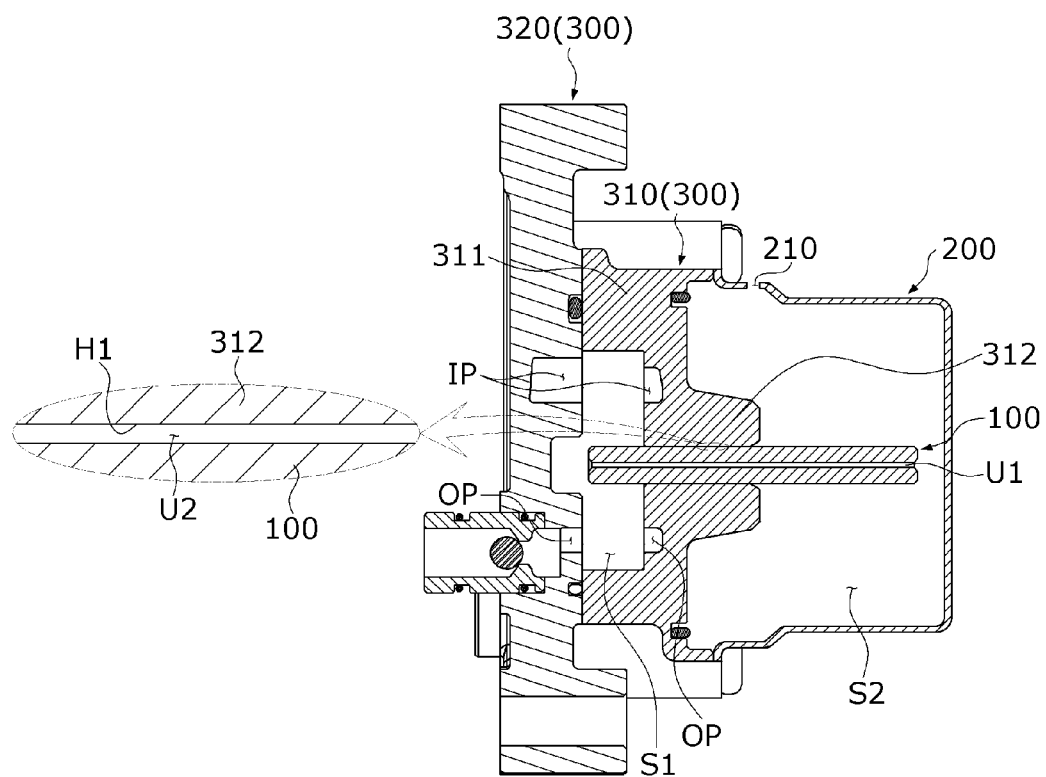

[FIG. 4]
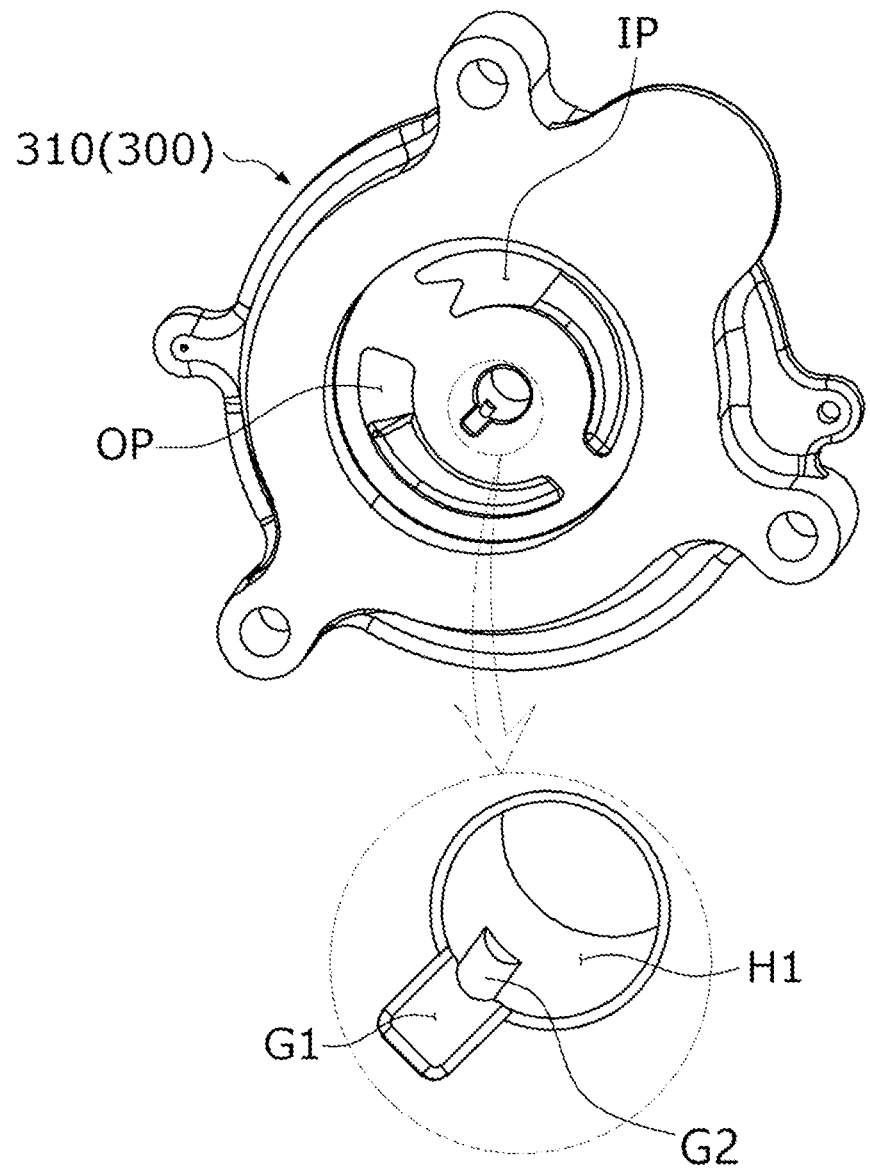

[FIG. 5]
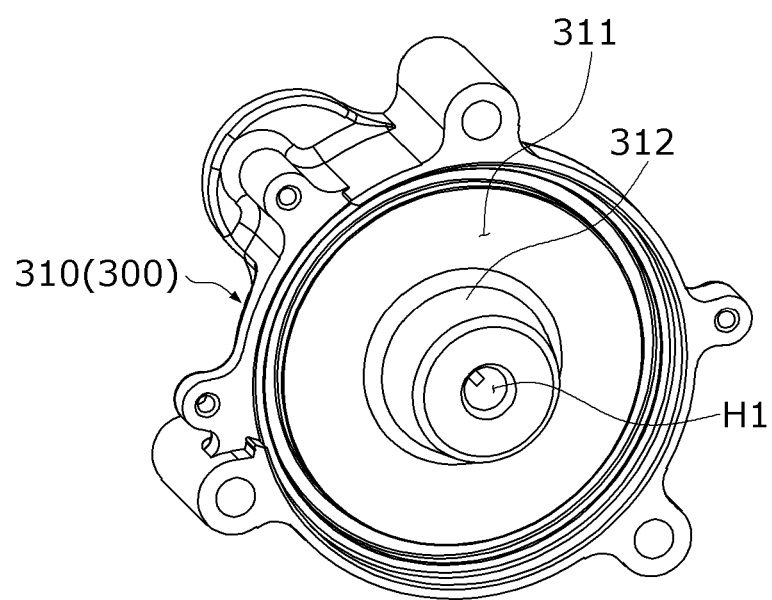

[FIG. 6]
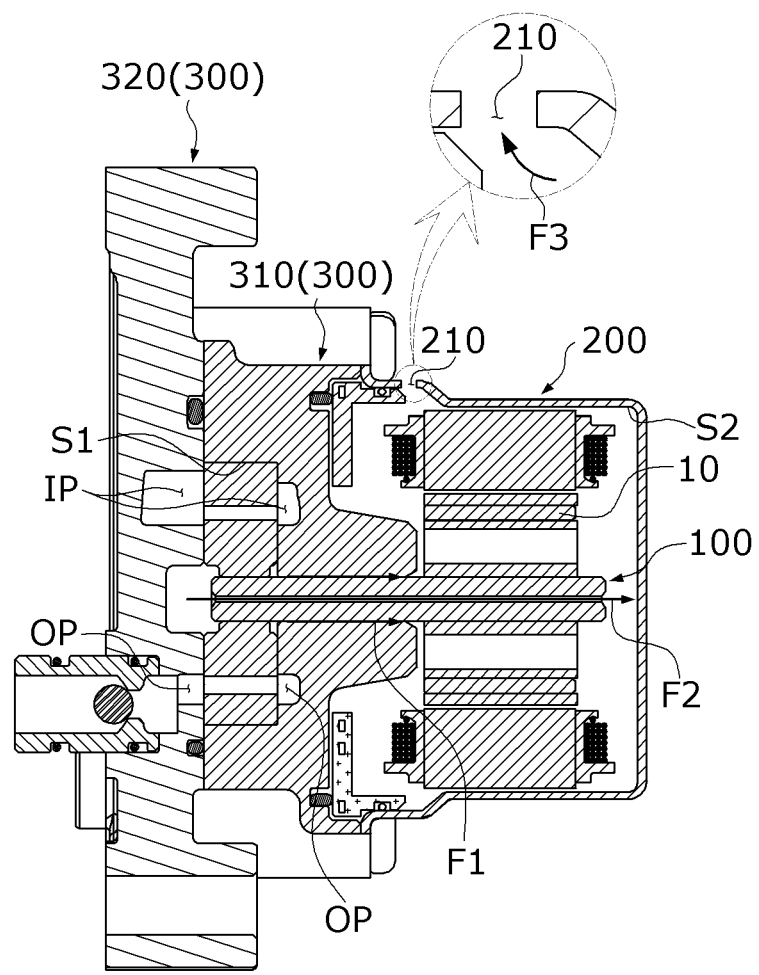

[FIG. 7]
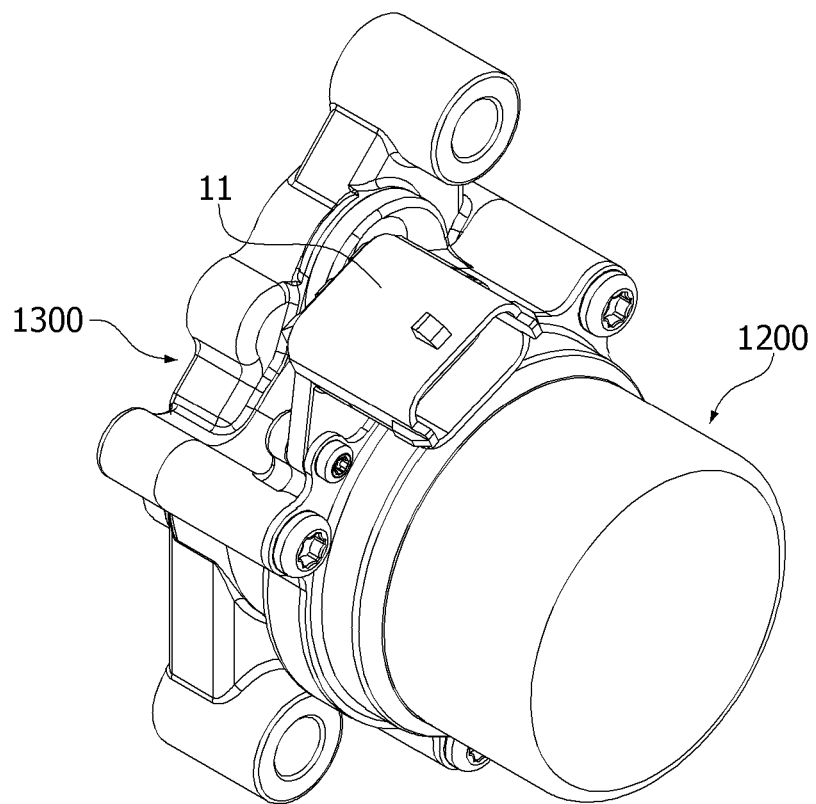

[FIG. 8]
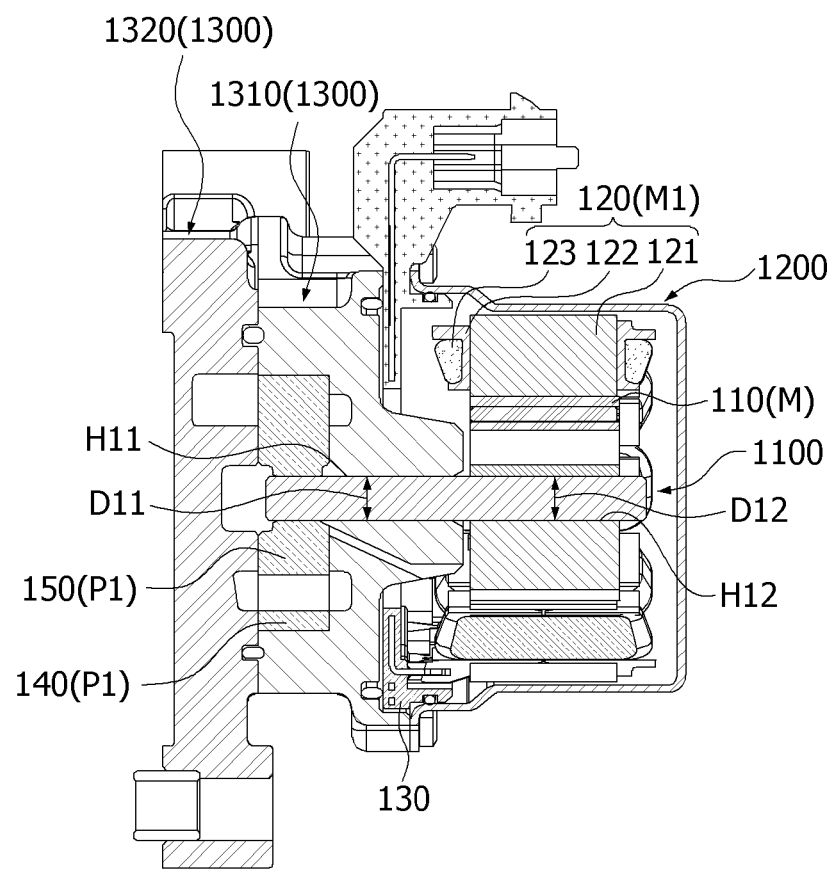

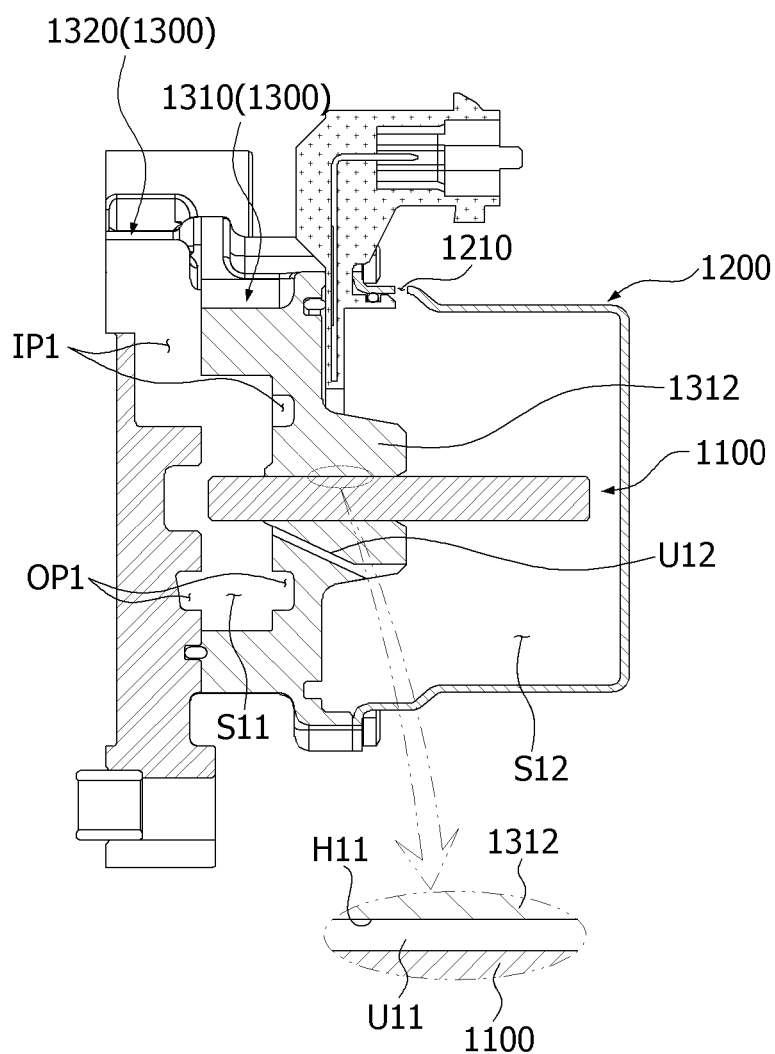
[FIG. 9]

[FIG. 10]
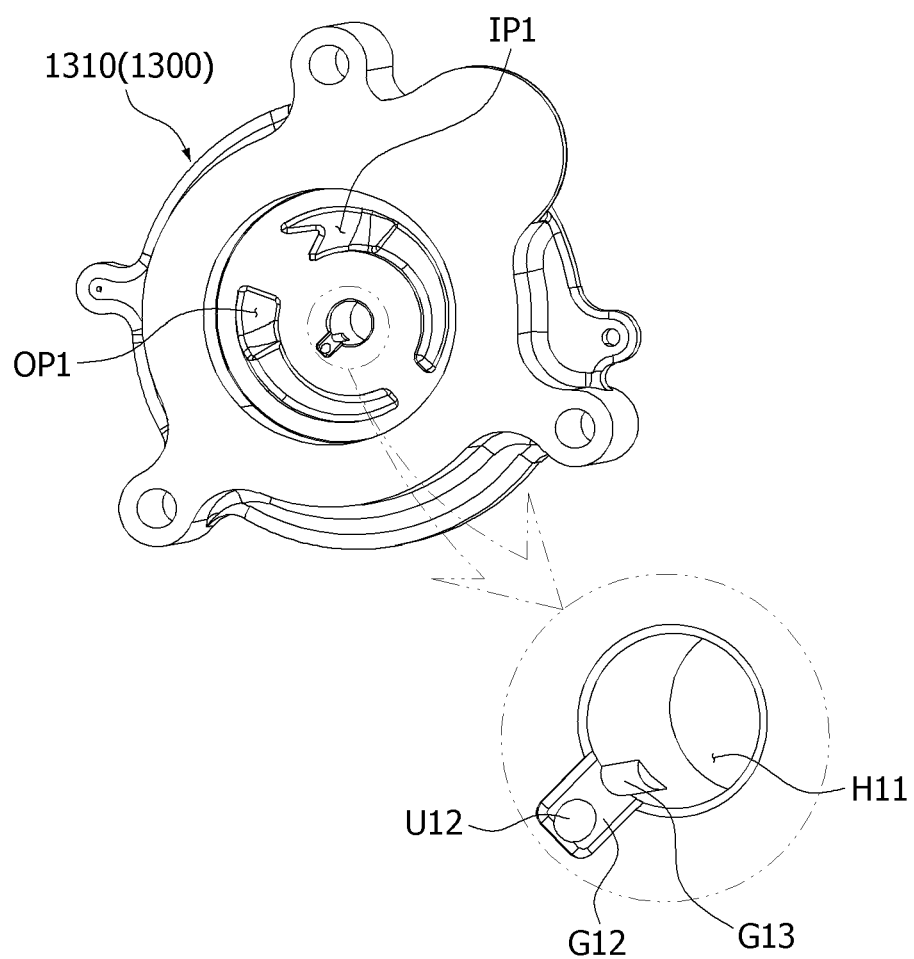

[FIG. 11]
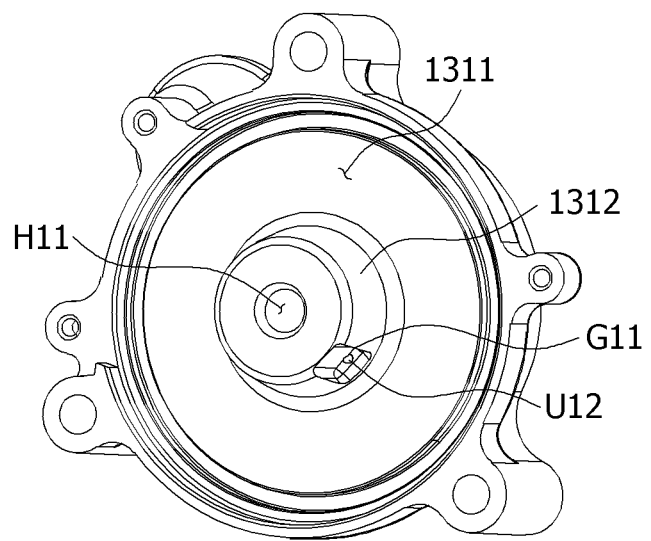

[FIG. 12]
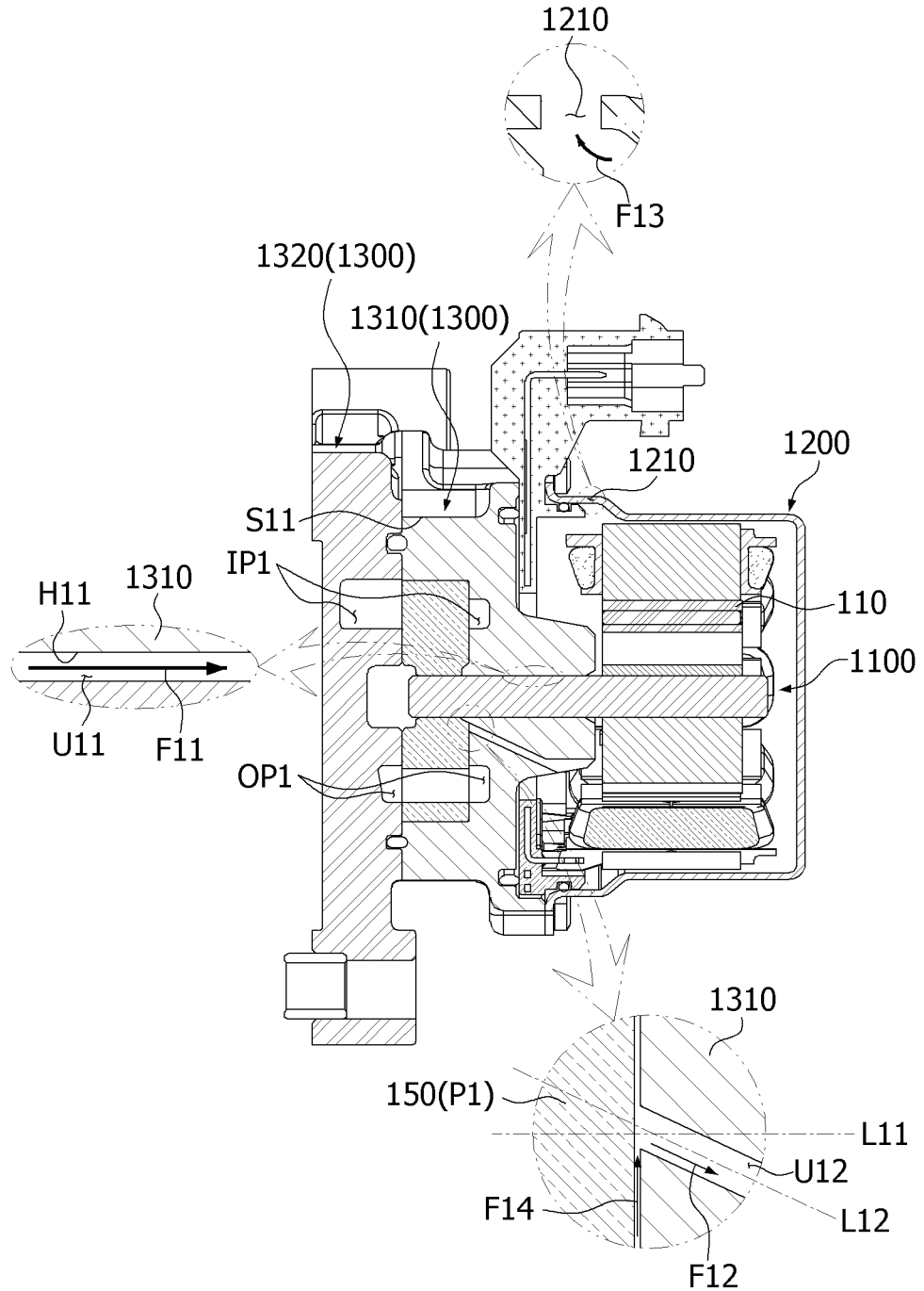

ELECTRIC MOTOR OIL PUMP DEVICE

CROSS-REFERENCE TO RELATED PATENT APPLICATIONS

This application is a U.S. National Stage Application under 35 U.S.C. § 371 of PCT Application No. PCT/KR2021/007887, filed Jun. 23, 2021, which claims priority to Korean Patent Application Nos. 10-2020-0076491, filed Jun. 23, 2020 and 10-2020-0079542, filed Jun. 29, 2020, whose entire disclosures are hereby incorporated by reference.

TECHNICAL FIELD

The present invention relates to a motor.

BACKGROUND ART

Motors may be drive sources which supply oil to hydraulic lines in transmissions or braking systems which require oil circulation. Such a motor may include a motor part and a pump part. The motor part may include a shaft, a rotor, a stator, and a housing for accommodating the rotor and the stator therein. The pump part may include a cover, an inner rotor connected to the shaft, and an outer rotor disposed in the cover and engaged with the inner rotor. A suction port and a discharge port may be disposed in the cover. When the rotor of the motor part rotates, a fluid (oil) is introduced through the suction port and discharged through the discharge port.

Heat generated by the motor part may be controlled through air cooling. However, when a size of the motor part increases, there is a problem that it is difficult to control heat generated by the motor part only through air cooling. When there is a limitation in controlling the heat generated by the motor part, there is a problem that a density of the motor part cannot be increased.

DISCLOSURE

Technical Problem

Accordingly, the present invention is intended to address the above problems and directed to providing a motor capable of effectively controlling heat generated in a motor part.

Objectives to be achieved by the present invention are not limited to the above-described objective, and other objectives which are not described above will be clearly understood by those skilled in the art through the following descriptions.

Technical Solution

One aspect of the present invention provides a motor including a housing including a motor part and a cover coupled to the housing and including a pump part, wherein the cover includes a first hole through which a first area in the cover communicates with a second area in the housing, the motor part includes a shaft passing through the first hole, a first flow path through which the first area communicates with the second area is formed in the shaft, a second flow path through which the first area communicates with the second area is formed between the shaft and the first hole, and an amount of a fluid introduced through the first flow path is greater than an amount of a fluid introduced through the second flow path for a predetermined time.

Another aspect of the present invention provides a motor including a housing including a motor part, a cover coupled to the housing and including a pump part, and a shaft connecting the pump part and the motor part, wherein a fluid in the cover is introduced into the housing along a hollow formed in the shaft and an outer surface of the shaft.

Still another aspect of the present invention provides a motor including a housing including a rotor and a stator, a cover coupled to the housing and including a pump part, and a shaft connecting the pump part and the rotor and including a hollow, wherein the pump part includes a first hole to which the shaft is rotatably coupled, the hollow and the first hole form a flow path through which a fluid is introduced into the housing, and the fluid introduced through the first hole reduces friction between the cover and the shaft when the shaft rotates.

The shaft may be rotatably supported by the cover without a bearing.

The pump part may include a suction port through which a fluid is introduced and a discharge port which communicates with the suction port and through which the fluid introduced through the suction port is discharged, and the suction port and the discharge port may communicate with an inner portion the housing so that a part of the fluid may be introduced into the housing.

The pump part may include a suction port through which a fluid is introduced and a discharge port which communicates with the suction port and through which the fluid introduced through the suction port is discharged, a part of the fluid introduced into the discharged port may be introduced into an inner portion of the housing, and the rest of the fluid may be discharged through the discharge port.

The housing may include a discharge hole through which the inner portion of the housing communicates with the outside of the housing, and a part of the fluid may be introduced into the inner portion of the housing from an inner portion of the cover, fill the housing, and be discharged through the discharge hole.

The cover may include a body including the pump part and an extension part disposed to protrude from one surface of the body in an axial direction, a part of the first hole may be disposed in the body, and the rest of the first hole may be disposed in the extension part.

The extension part may be disposed to overlap an busbar in a direction perpendicular to the axial direction.

The extension part may be disposed to overlap a part of an insulator in a direction perpendicular to the axial direction.

The second flow path may be a gap between an outer surface of the shaft and an inner wall of the hole.

The motor part may include a rotor, the rotor may include a second hole through which the shaft passes, and a diameter of the first hole may be greater than a diameter of the second hole.

A part of the fluid may be introduced into a gap between the inner surface of the cover and the outer surface of the shaft.

An amount of a fluid introduced through the first flow path may be in the range of 135% to 145% of an amount of a fluid introduced through the second flow path for a predetermined time.

A speed of the fluid in the first flow path may be in the range of 150% to 155% of a speed of the fluid in the second flow path.

Yet another aspect of the present invention provides a motor including a housing including a motor part and a cover coupled to the housing and including a pump part, wherein the cover includes and a first hole through which a first area in the cover communicates with a second area in the housing, the motor part includes a shaft passing through the first hole, a first flow path through which the first area communicates with the second area is formed between the shaft and the first hole, a second flow path through which the first area communicates with the second area is formed in the cover, and an amount of a fluid introduced into the housing through the second flow path is greater than an amount of a fluid introduced into the housing through the first flow path for a predetermined time.

The shaft may be rotatably supported by the cover without a bearing.

The pump part may include a suction port through which a fluid is introduced and a discharge port which communicates with the suction port and through which the fluid introduced through the suction port is discharged, and the suction port and the discharge port may communicate with an inner portion of the housing so that a part of the fluid may be introduced into the housing.

The pump part may include a suction port through which a fluid is introduced and a discharge port which communicates with the suction port and through which the fluid introduced through the suction port is discharged, a part of the fluid introduced through the suction port may be introduced into an inner portion of the housing, and the rest of the fluid may be discharged through the discharge port.

The housing may include a discharge hole through which an inner portion of the housing communicates with the outside of the housing, and a part of the fluid may be introduced into the inner portion of the housing from an inner portion of the cover, fill the housing, and be discharged through the discharge hole.

The cover may include a body including the pump part and an extension part disposed to protrude from one surface of the body in an axial direction, and the first hole and the second flow path may be disposed to pass through the body and the extension part, respectively.

A first groove may be disposed in a surface of the extension part, and an exit of the second flow path may be disposed in the first groove.

The pump part may include a suction port through which a fluid is introduced and a discharge port which communicates with the suction port and through which the fluid introduced through the suction port is discharged, the cover may include a partition wall partitioning the suction port and the discharge port, and a second groove connected to the first hole may be disposed in a surface of the partition, and an entrance of the second flow path may be disposed in the second groove.

A direction of the second flow path may be different from a direction of the first flow path.

An amount of a fluid introduced through the second flow path may be in the range of 1550% to 1650% of an amount of a fluid introduced through the first flow path for a predetermined time.

Advantageous Effects

According to one embodiment of the present invention, there is an advantage of significantly improving a cooling effect of a motor part by quickly supplying a fluid of a pump part to the motor part.

DESCRIPTION OF DRAWINGS

FIG. 1 is a perspective view illustrating a motor according to one exemplary embodiment of the present invention.

FIG. 2 is a side cross-sectional view of FIG. 1.

FIG. 3 is a cross-sectional view illustrating a first area of a cover and a second area of a housing.

FIG. 4 is a view illustrating an outer surface of a first part of the cover.

FIG. 5 is a view illustrating an inner surface of the first part of the cover.

FIG. 6 is a side cross-sectional view showing a flow of a fluid flowing from the cover toward the housing.

FIG. 7 is a perspective view illustrating a motor according to another exemplary embodiment of the present invention.

FIG. 8 is a side cross-sectional view of FIG. 7.

FIG. 9 is a cross-sectional view illustrating a first area of a cover and a second area of a housing.

FIG. 10 is a view illustrating an outer surface of a first part of the cover.

FIG. 11 is a view illustrating an inner surface of the first part of the cover.

FIG. 12 is a side cross-sectional view showing a flow of a fluid flowing from the cover toward the housing.

MODES OF THE INVENTION

A direction parallel to a longitudinal direction (vertical direction) of a shaft is referred to as an axial direction, a direction perpendicular to the axial direction with respect to the shaft is referred to as a radial direction, and a direction along a circle having a radius in the radial direction with respect to the shaft is referred to as a circumferential direction.

FIG. 1 is a perspective view illustrating a motor according to one exemplary embodiment of the present invention, and FIG. 2 is a side cross-sectional view of FIG. 1.

Hereinafter, the term "inward" refers to a direction from the housing 200 toward the shaft 100 which is a center of the motor, and the term "outward" refers to a direction opposite to "inward," that is, the direction from the shaft 100 toward the housing 200. In addition, each of a circumferential direction or a radial direction is defined based on an axial center.

Referring to FIGS. 1 and 2 together, the motor according to one exemplary embodiment of the present invention may include the housing 200 and a cover 300. The housing 200 may include a motor part M. The cover 300 may include a pump part P. The cover 300 may be coupled to the housing 200.

The motor part M is a part which transmits power to the pump part P and may include the shaft 100, a rotor 10, and a stator 20.

The shaft 100 may be coupled to the rotor 10. The shaft 100 is disposed to extend from the motor part M to the pump part P. The shaft 100 may be rotatably disposed on the cover 300. An end portion of the shaft 100 may be coupled to an inner rotor 50 of the pump part P. When a current is supplied, and an electromagnetic interaction occurs between the rotor 10 and the stator 20, the rotor 10 rotates, and the shaft 100 rotates in conjunction with the rotation of the rotor 10. When the shaft 100 rotates, the inner rotor 50 rotates, and the pump part P operates.

The rotor 10 rotates due to an electrical interaction with the stator 20. The rotor 10 may be disposed inside the stator 20 to correspond to the stator 20.

The stator 20 is disposed outside the rotor 10. The stator 20 may include a stator core 21, an insulator 22, and a coil 23. The insulator 22 is seated on the stator core 21. The coil 23 is mounted on the insulator 22. The coil 23 and a magnet of the rotor 10 induce an electrical interaction.

A busbar 30 may be disposed at one side of the stator 20 and connected to the coil 23.

The housing 200 may be disposed outside the stator 20. The housing 200 may be a cylindrical member.

The pump part P serves to receive power from the motor part M and pump a fluid. The pump part P may include an outer rotor 40 and the inner rotor 50. The outer rotor 40 is disposed outside the inner rotor 50. In addition, N outer lobes may be formed outward in a radial direction with respect to an axial center on the inner rotor 50 in a circumferential direction. Meanwhile, N+1 inner lobes may be formed inward in the radial direction on the outer rotor 40. In this case, the outer lobes may be formed to be engaged with the inner lobes. As the inner rotor 50 rotates, the outer rotor 40 rotates at a rotation ratio of (N+1)/N. The pump part P has a predetermined eccentric structure when the inner rotor 50 rotates, and a space, through which a fluid (oil) may flow, is formed between the inner rotor 50 and the outer rotor 40 by the eccentricity. That is, during rotational movement of the inner rotor 50, a portion, of which a volume has increased, suctions a surrounding fluid due to a decrease in pressure, and a portion, of which a volume has decreased, discharges a fluid due to an increase in pressure.

FIG. 3 is a cross-sectional view illustrating a first area S1 of the cover 300 and a second area S2 of the housing 200.

Referring to FIG. 3, the cover 300 includes the first area S1 therein. The first area S1 is a space which is filled with a fluid introduced into the cover 300 and in which the inner rotor 50 and the outer rotor 40 may be positioned. The first area S1 may include a suction port IP and a discharge port OP. The cover 300 may be disposed to be divided into a first part 310 and a second part 320 which are coupled to each other. The first part 310 may be coupled to the housing 200, and the second part 320 may be coupled to an external device.

The housing 200 includes the second area S2. The second area S2 is a space in which the rotor 10 and the stator 20 are positioned.

The cover 300 may include a first hole H1 through which the first area S1 and the second area S2 communicate with each other. The shaft 100 is disposed to pass through the first hole H1.

The motor according to the embodiment may include a first flow path U1 and a second flow path U2 through which a part of a fluid introduced into the first area S1 is sent to the second area S2.

The first flow path U1 is defined as a hollow of the shaft 100 formed in a longitudinal direction of the shaft 100. The first flow path U1 through which the first area S1 and the second area S2 communicate with each other.

The second flow path U2 is defined as a gap between an inner wall of the first hole H1 and an outer surface of the shaft 100. The second flow path U2 through which the first area S1 and the second area S2 communicate with each other. The rotor 10 includes a second hole H2 through which the shaft 100 pass, and a diameter D1 of the first hole H1 is greater than a diameter D2 of the second hole H2 so that the second flow path U2 is formed.

FIG. 4 is a view illustrating an outer surface of the first part 310 of the cover 300.

Referring to FIG. 4, the first hole H1 is disposed in the outer surface of the first part 310 of the cover 300. In addition, each of the suction port IP and the discharge port OP may be concavely formed around the first hole H1 in the outer surface of the first part 310 of the cover 300. In addition, a first groove G1 and a second groove G2 may be disposed in the outer surface of the first part 310. The first groove G1 may be disposed to be connected to the first hole H1. The second groove G2 may be disposed inside the first hole H1 and connected to the first groove G1. The second groove G2 may be concavely disposed in the inner wall of the first hole H1. The first groove G1 and the second groove G2 guide a fluid in the first area S1 to easily flow into the first flow path U1.

FIG. 5 is a view illustrating an inner surface of the first part 310 of the cover 300.

Referring to FIGS. 3 and 5, the first part 310 of the cover 300 may include a body 311 and an extension part 312. The extension part 312 protrudes from one surface of the body 311 in an axial direction. In a state in which the second part 320 is coupled to the housing 200, the extension part 312 protrudes toward the rotor 10 in the axial direction. The extension part 312 may be a conical member of which an end is cut. A portion of the first hole H1 may be disposed in the body 311, and the rest of the first hole H1 may be disposed in the extension part 312.

The extension part 312 may be disposed to overlap the busbar 30 in a direction perpendicular to the axial direction. Alternatively, the extension part 312 may be disposed to overlap a part of the insulator 22 in a direction perpendicular to the axial direction.

The shaft 100 is rotatably supported by the cover 300 without a separate bearing. Specifically, the shaft 100 is rotatably supported by the first hole H1.

Since a length of the first hole H1 increases through the extension part 312, the shaft 100 can be sufficiently supported without the separate bearing. The extension part 312 may be disposed close to the rotor 10 in the axial direction in order to secure the sufficient length of the first hole H1. In particular, although the shaft 100 is disposed to extend from the motor part M to the pump part P, since the first hole H1 is disposed between the motor part M and the pump part P in the axial direction, the shaft 100 can be stably supported without the bearing.

FIG. 6 is a side cross-sectional view showing a flow of a fluid flowing from the cover 300 toward the housing 200.

Referring to FIGS. 3 and 6, a fluid is introduced through the suction port IP and pumped to and discharged through the discharge port OP. A part of the fluid fills the housing 200 through the first flow path U1 and the second flow path U2.

When the rotor 10 rotates and the pump part P operates, a relatively high pressure state of the first area S1 is maintained compared to the second area S2. In addition, When the pump part P operates, a pressure of the discharge port OP increases, fluids at the discharge port OP are introduced into a gap between the inner rotor 50 and an inner wall of the cover 300 from the discharge port OP, and the introduced fluids of the pump part P are introduced into the first flow path U1, that is the hollow disposed in the shaft 100, like a flow F1 of FIG. 6, and flow to the motor part M due to a pressure difference between the first area S1 and the second area S2. The fluid introduced into the motor part M through the first flow path U1 fills an inner portion of the housing 200.

In addition, the fluids at the discharge port OP are introduced into the gap between the inner rotor 50 and the inner wall of the cover 300 from the discharge port OP, and the fluid of the pump part P is introduced into the second flow path U2, that is, the gap between the inner wall of the first hole H1 and the outer surface of the shaft 100 like a flow F2 of FIG. 6. The fluid introduced as described above flows to the motor part M due to the pressure difference between the first area S1 and the second area S2. The fluid introduced into the motor part M through the second flow path U2 fills the inner portion of the housing 200. The fluid introduced into the second flow path U2 can reduce friction between the cover 300 and the shaft 100 when the shaft 100 rotates.

The fluid introduced into the housing 200 through the first flow path U1 and the second flow path U2 as described above may scatter as the rotor 10 rotates. The scattered fluid cools the motor part M by exchanging heat with the rotor 10, the stator 20, the housing 200, an inverter housing disposed adjacent thereto, and the like.

Meanwhile, the fluid introduced into the housing 200 through the first flow path U1 and the second flow path U2 may fill the inner portion of the housing 200 until the fluid occupies 90% of a reference volume of the housing 200. In this case, the reference volume refers to an empty volume other than a volume occupied by the motor part M, for example, the shaft 100, the rotor 10, the stator 20, and the busbar 30 in a total volume of the housing 200. When the fluid is introduced into the housing 200 and occupies more than 90% of the reference volume, the fluid filling the housing 200 can be discharged to the outside of the housing 200 through a discharge hole 210. A part of the fluid introduced through the suction port IP is discharged through the discharge port OP, and the rest of the fluid is heat exchanged at the motor part M and discharged through the discharge hole 210.

In order to increase a cooling speed of the motor part M, a filling time of the fluid in the housing 200 should be reduced.

To this end, first, the motor according to the embodiment has a feature of additionally including the first flow path U1 in addition to the second flow path U2 to reduce the filling time of the fluid in the housing 200. In addition, there is a feature that an amount of the fluid introduced into the housing 200 through the first flow path U1 is greater than an amount of the fluid introduced into the housing 200 through the second flow path U2 for a predetermined time. A speed of the fluid passing through the first flow path U1 may be faster than a speed of the fluid passing through the second flow path U2.

As described above, the fluid may be quickly supplied to the housing 200 through the first flow path U1 in a hollow type disposed in the shaft 100 as well as the second flow path U2. An amount of the fluid introduced through the first flow path U1 may be in the range of 135% to 145% of an amount of the fluid introduced through the second flow path U2 for a predetermined time. Alternatively, a speed of the fluid in the first flow path U1 may be in the range of 150% to 155% of a speed of the fluid in the second flow path U2.

Within this range, the filling time of the fluid in the housing 200 can be reduced without affecting a discharge pressure of the pump part P.

Second, the motor according to the embodiment has a feature of quickly supplying the fluid to the housing 200 by guiding a part of the fluid pumped at a relatively high pressure at the discharge port OP of the pump part P toward the housing 200. Although an area of a cross-section of the first flow path U1 and an area of a cross-section of the second flow path U2 are insufficient to quickly supply the fluid to the housing 200, the filling time of the fluid in the housing 200 can be significantly reduced by increasing the speeds of the fluids flowing in the first flow path U1 and the second flow path U2 using the fluids pumped by the pump part P.

[Table 1] below is a table comparing a filling time of a fluid in a housing 200 of a motor according to a comparative example and a filling time of a fluid in the housing 200 of the motor according to an example.

The motor according to the comparative example is a motor in which only a second flow path U2 is disposed.

TABLE 1

| | Fluid temperature | Discharge pressure | Speed of fluid | Flow rate of fluid | Filling time(sec) | | | |
|---|---|---|---|---|---|---|---|---|
| | | | | | 50% | 70% | 90% | 100% |
| Comparative example | 120° C. | 6 Bar | Second flow path 0.75 m/sec | 0.085 LPM | 12 | 17 | 22 | 24 |
| Example | 120° C. | 6 Bar | Second flow path (U2): 0.7 m/sec | 0.08 LPM | 5.3 | 7.4 | 9.5 | 10.6 |
| | | | First flow path (U1): 1.08 m/sec | 0.1145 LPM | | | | |

In conditions that a reference volume is 34.3 cc, a fluid temperature is 120° C., a pressure of a fluid discharged from the discharge port OP is 6 Bar, and a speed of the motor part M is 3300 rpm, as can be seen in Table 1, in the case of the comparative example, a speed of a fluid in the second flow path U2 is 0.75 msec, and in the case of the example, a speed of a fluid in the second flow path U2 is 0.7 msec, that is, the speeds of the comparative example and the example are similar to each other. A flow rate through the second flow path U2 of the comparative example is measured at 0.085 liters per minute (LPM).

In the case of the example, a speed of a fluid in the first flow path U1 is 1.08 msec which is faster than the speed of 0.7 msec of the fluid in the second flow path U2, and a flow rate through the second flow path U2 of the example is 0.08 LPM which is similar to that of the comparative example, but a flow rate of 0.1145 LPM through the first flow path U1 is added thereto. In this case, it is seen that the flow rate through the first flow path U1 is 143% of the flow rate through the second flow path U2. In addition, it is seen that the speed of the fluid in the first flow path U1 is 154% of the speed of the fluid in the second flow path U2.

When comparing filling times of occupying 90% of the reference volume, it can be seen that the filling time of the comparative example is 22 seconds, and the filling time of the example is 9.5 seconds, that is, the filling time of the example is much faster than the filling time of the comparative example. As a result, it can be seen that the cooling performance of the example is very high under the same condition of the discharge pressure of the pump part P of each of the comparative example and the example.

FIG. 7 is a perspective view illustrating a motor according to another exemplary embodiment of the present invention, and FIG. 8 is a side cross-sectional view of FIG. 7.

Referring to FIGS. 7 and 8 together, a motor according to another exemplary embodiment of the present invention may include a housing 1200 and a cover 1300. The housing 1200 may include a motor part M1. The cover 1300 may include a pump part P1. The cover 1300 may be coupled to the housing 1200.

The motor part M1 is a part which transmits power to the pump part P1 and may include a shaft 1100, a rotor 110, and a stator 120.

The shaft 1100 may be coupled to the rotor 110. The shaft 1100 is disposed to extend from the motor part M1 to the pump part P1. The shaft 1100 may be rotatably disposed in the cover 1300. An end portion of the shaft 1100 may be coupled to an inner rotor 150 of the pump part P1. When a current is supplied, and an electromagnetic interaction occurs between the rotor 1110 and the stator 1120, the rotor 1110 rotates, and the shaft 1100 rotates in conjunction with the rotation of the rotor 1110. When the shaft 1100 rotates, the inner rotor 150 rotates, and the pump part P1 operates.

The rotor 1110 rotates due to an electrical interaction with the stator 1120. The rotor 1110 may be disposed inside the stator 1120 to correspond to the stator 1120.

The stator 1120 is disposed outside the rotor 1110. The stator 1120 may include a stator core 1121, an insulator 1122, and a coil 1123. The insulator 1122 is seated on the stator core 1121. The coil 1123 is mounted on the insulator 1122. The coil 1123 and a magnet of the rotor 1110 induce an electrical interaction.

A busbar 130 may be disposed at one side of the stator 1120 and connected to the coil 1123.

The housing 1200 may be disposed outside the stator 1120. The housing 1200 may be a cylindrical member.

The pump part P1 serves to receive power from the motor part M1 and pump a fluid. The pump part P1 may include an outer rotor 140 and the inner rotor 150. The outer rotor 140 is disposed outside the inner rotor 150. In addition, N outer lobes may be formed outward in a radial direction with respect to an axial center on the inner rotor 150 in a circumferential direction. Meanwhile, N+1 inner lobes may be formed inward in the radial direction on the outer rotor 140. In this case, the outer lobes may be formed to be engaged with the inner lobes. As the inner rotor 150 rotates, the outer rotor 140 rotates at a rotation ratio of (N+1)/N. The pump part P1 has a predetermined eccentric structure when the inner rotor 150 rotates, and a space, through which a fluid (oil) may be transmitted, is formed between the inner rotor 150 and the outer rotor 140 by the eccentricity. That is, during rotational movement of the inner rotor 150, a portion, of which a volume has increased, suctions a surrounding fluid due to a decrease in pressure, and a portion, of which a volume has decreased, discharges a fluid due to an increase in pressure.

FIG. 9 is a cross-sectional view illustrating a first area S11 of the cover 1300 and a second area S12 of the housing 1200.

Referring to FIG. 9, the cover 1300 includes the first area S11 therein. The first area S11 is a space which is filled with a fluid introduced into the cover 1300 and in which the inner rotor 150 and the outer rotor 140 may be positioned. The first area S11 may include a suction port IP1 and a discharge port OP1. The cover 1300 may be disposed to be divided into a first part 1310 and a second part 1320 which are coupled to each other. The first part 1310 may be coupled to the housing 1200, and the second part 1320 may be coupled to an external device.

The housing 1200 includes the second area S12. The second area S12 is a space in which the rotor 1110 and the stator 1120 are positioned.

The cover 1300 may include a first hole H11 through which the first area S11 and the second area S12 communicate with each other. The shaft 1100 is disposed to pass through the first hole H11.

The motor according to the embodiment may include a first flow path U11 and a second flow path U12 through which a part of a fluid introduced into the first area S11 is sent to the second area S12.

The first flow path U11 is defined as a hollow of the shaft 1100 formed in a longitudinal direction of the shaft 1100. The first flow path U11 through which the first area S11 and the second area S12 communicate with each other.

The second flow path U12 is disposed to pass through the cover 1300. An entrance of the second flow path U12 is disposed in the first area S11, and an exit of the second flow path U12 is disposed in the second area S12. The second flow path U12 through which the first area S11 and the second area S12 communicate with each other.

The rotor 1110 includes a second hole H12 through which the shaft 1100 pass, and a diameter D11 of the first hole H11 is greater than a diameter D12 of the second hole H12 so that the second flow path U12 is formed.

FIG. 10 is a view illustrating an outer surface of the first part 1310 of the cover 1300.

Referring to FIG. 10, the first hole H11 is disposed in the outer surface of the first part 1310 of the cover 1300. In addition, each of the suction port IP1 and the discharge port OP1 may be concavely formed around the first hole H11 in the outer surface of the first part 1310 of the cover 1300. In addition, a second groove G12 and a third groove G13 may be disposed in the outer surface of the first part 1310. The second groove G12 may be disposed to be connected to the first hole H11. The third groove G13 may be disposed inside the first hole H11 to be connected to the second groove G12. The third groove G13 may be concavely disposed in an inner wall of the first hole H11. The second groove G12 and the third groove G13 guide a fluid in the first area S11 to easily flow into the first flow path U11.

Meanwhile, the entrance of the second flow path U12 may be disposed in the second groove G12. Accordingly, the entrance of the second flow path U12 is disposed close to the first hole H11, and a part of a fluid flowing into the first hole H11 flows into the first flow path U11. Since the entrance of the second flow path U12 is disposed in the second groove G12, the fluid is easily introduced between the inner rotor 150 and an inner surface of the cover 1300 through the second flow path U12.

FIG. 11 is a view illustrating an inner surface of the first part 1310 of the cover 1300.

Referring to FIGS. 9 and 11, the first part 1310 of the cover 1300 may include a body 1311 and an extension part 1312. The extension part 1312 protrudes from one surface of the body 1311 in an axial direction. In a state in which the second part 1320 is coupled to the housing 1200, the extension part 1312 protrudes toward the rotor 1110 in the axial direction. The extension part 1312 may be a conical member of which an end is cut. A portion of the first hole H11 may be disposed in the body 1311, and the rest of the first hole H11 may be disposed in the extension part 1312.

A first groove G11 is disposed in a side surface of the extension part 1312. The first groove G11 may be concavely formed in a surface of the extension part 1312. The exit of the second flow path U12 may be disposed in the first groove G11.

The extension part 1312 may be disposed to overlap the busbar 130 in a direction perpendicular to the axial direction. Alternatively, the extension part 1312 may be disposed to overlap a part of the insulator 1122 in a direction perpendicular to the axial direction.

The shaft 1100 is rotatably supported by the cover 1300 without a separate bearing. Specifically, the shaft 1100 is rotatably supported by the first hole H11.

Since a length of the first hole H11 increases through the extension part 1312, the shaft 1100 can be sufficiently supported without the separate bearing. The extension part 1312 may be disposed close to the rotor 1110 in the axial direction in order to secure the sufficient length of the first hole H11. In particular, although the shaft 1100 is disposed to extend from the motor part M1 to the pump part P1, since the first hole H11 is disposed between the motor part M1 and the pump part P1 in the axial direction, the shaft 1100 can be stably supported without the bearing.

FIG. 12 is a side cross-sectional view showing a flow of a fluid flowing from the cover 1300 toward the housing 1200.

Referring to FIGS. 9 and 12, a fluid is introduced through the suction port IP1 and pumped to and discharged through the discharge port OP1. A part of the fluid fills the housing 1200 through the first flow path U11 and the second flow path U12.

When the rotor 1110 rotates, and the pump part P1 operates, a relatively high pressure state of the first area S11 is maintained compared to the second area S12. In addition, when the pump part P1 operates, a pressure of the discharge port OP1 increases, fluids at the discharge port OP1 are introduced into a gap between the inner rotor 150 and an inner wall of the cover 1300 from the discharge port OP1, and the introduced fluids of the pump part P1 are introduced into the first flow path U11, that is, a gap between the inner wall of the first hole H11 and an outer surface of the shaft 1100, and flow to the motor part M1 due to a pressure difference between the first area S11 and the second area S12 like a flow F11 of FIG. 12. The fluid introduced into the motor part M1 through the first flow path U11 fills an inner portion of the housing 1200. When the shaft 1100 rotates, the fluid introduced into the first flow path U11 may reduce friction between the cover 1300 and the shaft 1100.

In addition, like a flow F14 of FIG. 12, the fluids at the discharge port OP1 are introduced into the gap between the inner rotor 150 and the inner wall of the cover 1300 from the discharge port OP1, and the fluid of the pump part P1 is introduced into the second flow path U12 like a flow F12 of FIG. 12. The fluid introduced as described above flows to the motor part M1 due to the pressure difference between the first area S11 and the second area S12. The fluid introduced into the motor part M1 through the second flow path U12 fills the inner portion of the housing 1200.

The fluid introduced into the housing 1200 through the first flow path U11 and the second flow path U12 as described above may scatter as the rotor 1110 rotates. The scattered fluid cools the motor part M1 by exchanging heat with the rotor 1110, the stator 1120, the housing 1200, the inverter housing disposed adjacent thereto, and the like.

The second flow path U12 may be obliquely disposed so that a reference line L12 indicating a longitudinal direction of the second flow path U12 is obliquely disposed with respect to a reference line L11 indicating the axial direction of the motor. Accordingly, positions of the entrance and the exit of the second flow path U12 are different in the radial direction. The entrance of the second flow path U12 may be disposed closer to the first flow path U11 than the exit.

Meanwhile, the fluid introduced into the housing 1200 through the first flow path U11 and the second flow path U12 may fill the inner portion of the housing 1200 until the fluid occupies 90% of a reference volume of the housing 1200. Here, the reference volume refers to an empty volume other than a volume occupied by the motor part M1, for example, the shaft 1100, the rotor 1110, the stator 1120, and the busbar 130 in a total volume of the housing 1200. When the fluid is introduced into the housing 1200 and occupies more than 90% of the reference volume, the fluid filling the housing 1200 can be discharged to the outside of the housing 1200 through a discharge hole [1201] 1210. A part of the fluid introduced into the suction port IP1 is discharged through the discharge port OP1, and the rest of the fluid is heat exchanged at the motor part M1 and discharged through the discharge hole 1210.

In order to increase a cooling speed of the motor part M1, a filling time of the fluid in the housing 1200 should be reduced.

To this end, first, the motor according to the embodiment has a feature of additionally including the second flow path U12 in addition to the first flow path U11 to reduce the filling time of the fluid in the housing 1200. In addition, there is a feature that an amount of the fluid introduced into the housing 1200 through the second flow path U12 is greater than an amount of the fluid introduced into the housing 1200 through the first flow path U11 for a predetermined time. A speed of the fluid passing through the second flow path U12 may be faster than a speed of the fluid passing through the first flow path U11.

As described above, the fluid may be quickly supplied to the housing 1200 through the second flow path U12 disposed in the shaft 1100 as well as the first flow path U11. An amount of the fluid introduced through the second flow path U12 may be in the range of 1550% to 1650% of an amount of the fluid introduced through the first flow path U11 for a predetermined time. Alternatively, a speed of the fluid in the first flow path U11 may be in the range of 1650% to 1750% of a speed of the fluid in the second flow path U12.

Within this range, the filling time of the fluid in the housing 1200 can be reduced without affecting a discharge pressure of the pump part P1.

Second, the motor according to the embodiment has a feature of quickly supplying the fluid to the housing 1200 by guiding a part of the fluid pumped at a relatively high pressure at the discharge port OP1 of the pump part P1 toward the housing 1200. Although an area of a cross-section of the first flow path U11 and an area of a cross-section of the second flow path U12 are insufficient to quickly supply the fluid to the housing 1200, the filling time of the fluid in the housing 1200 can be significantly reduced by increasing the speeds of the fluids flowing in the first flow path U11 and the second flow path U12 using the fluids pumped by the pump part P.

Table 2 below is a table comparing a filling time of a fluid in a housing 1200 of a motor according to a comparative example and a filling time of a fluid in the housing 1200 of the motor according to an example.

The motor according to the comparative example is a motor in which only a second flow path U11 is disposed.

TABLE 2

| | Fluid temperature | Discharge pressure | Speed of fluid | Flow rate of fluid | Filling time(sec) | | | |
|---|---|---|---|---|---|---|---|---|
| | | | | | 50% | 70% | 90% | 100% |
| Comparative example | 120° C. | 6 Bar | Second flow path 0.75 m/sec | 0.085 LPM | 12 | 17 | 22 | 24 |
| Example | 120° C. | 6 Bar | First flow path(U11): 0.07 m/sec | 0.008 LPM | 7.4 | 10.4 | 13.5 | 14.9 |
| | | | Second flow path (U12): 1.22 m/sec | 0.1296 LPM | | | | |

In conditions that a reference volume is 34.3 cc, a fluid temperature is 120° C., a pressure of a fluid discharged from the discharge port OP1 is 6 Bar, and a speed of the motor part M1 is 3300 rpm, as can be seen from Table +2, in the case of the comparative example, a speed of a fluid in a first path U11 is 0.75 m/sec, and in the case of the example, a speed of a fluid in the first flow path U11 is 0.07 m/sec, that is, the speed of the example is much smaller than the speed of the comparative example. This is because the entrance of the second flow path U12 is disposed adjacent to the first flow path U11 so that a majority of the fluid flowing into the first flow path U11 is guided to the second flow path U12.

A flow rate through the first flow path U11 of the comparative example is measured at 0.085 LPM (liters per minute).

In the case of the example, a speed of a fluid in the second flow path U12 is 1.22 msec which is much faster than the speed of 0.07 msec of the fluid in the first flow path U11, and the flow rate through the first flow path U11 of the example is 0.008 PLM which is much smaller than that of the comparative example, but a flow rate of 0.296 LPM through the second flow path U12 is added thereto. In this case, it is seen that the flow rate through the second flow path U12 is 1620% of the flow rate through the first flow path U11. In addition, it is seen that the speed of the fluid in the first flow path U11 is 1742% of the speed of the fluid in the second flow path U12.

When comparing filling times of occupying 90% of the reference volume, it can be seen that the filling time of the comparative example is 22 seconds, and the filling time of the example is 13.5 seconds, that is, the filling time of the example is much faster than the filling time of the comparative example. As a result, it can be seen that, the cooling performance of the example is very high under the same condition of the discharge pressure of the pump part P1 of each of the comparative example and the example.

The above-described embodiments can be used in various devices for vehicles or home appliances.

The invention claimed is:

1. A motor comprising:
a housing including a motor part; and
a cover coupled to the housing and including a pump part, wherein
the cover includes a first hole through which a first area in the cover communicates with a second area in the housing,
the motor part includes a shaft passing through the first hole,
a first flow path through which the first area communicates with the second area is formed in the shaft,
a second flow path through which the first area communicates with the second area is formed between the shaft and the first hole, and
an amount of a fluid introduced through the first flow path is greater than an amount of a fluid introduced through the second flow path for a predetermined time,
wherein the cover includes a body including the pump part and an extension part disposed to protrude from one surface of the body in an axial direction, a part of the first hole is disposed in the body, and the rest of the first hole is disposed in the extension part,
wherein the pump includes a suction port through which the pump part receives fluid, and a discharge port that is connected to the suction port and through which the fluid that has entered the suction port is discharged,
wherein the cover includes a partition wall partitioning the suction port and the discharge port, and a surface of the partition wall includes a first groove connected to the first hole and a second groove concavely formed on an inner wall of the first hole, and
wherein the first groove and the second groove are connected.

2. The motor of claim 1, wherein a fluid in the cover is introduced into the housing along a hollow formed in the shaft and an outer surface of the shaft.

3. The motor of claim 1,
wherein the fluid introduced through the first hole reduces friction between the cover and the shaft when the shaft rotates.

4. The motor of claim 1, wherein the shaft is rotatably supported by the cover without a bearing.

5. The motor of claim 1, wherein the suction port and the discharge port communicate with an inner portion the housing so that a part of the fluid is introduced into the housing.

6. A motor comprising:
a housing including a motor part; and
a cover coupled to the housing and including a pump part, wherein
the cover includes a first hole through which a first area in the cover communicates with a second area in the housing,
the motor part includes a shaft passing through the first hole,
a first flow path through which the first area communicates with the second area is formed between the shaft and the first hole,
a second flow path through which the first area communicates with the second area is formed in the cover, and an amount of a fluid introduced into the housing through the second flow path is greater than an amount of a fluid introduced into the housing through the first flow path for a predetermined time, wherein the pump includes a suction port through which the pump part receives fluid, and a discharge port that is connected to the suction port and through which the fluid that has entered the suction port is discharged, wherein the cover includes a partition wall partitioning the suction port and the discharge port, and a surface of the partition wall includes a second groove connected to the first hole and a third groove concavely formed on an inner wall of the first hole, and wherein the second groove and the third groove are connected.

7. The motor of claim 6, wherein an entrance of the second flow path is disposed in the second groove.

8. The motor of claim 6, wherein:

the pump part includes a suction port through which a fluid is introduced and a discharge port which communicates with the suction port and through which the fluid introduced through the suction port is discharged; and the suction port and the discharge port communicate with an inner portion of the housing so that a part of the fluid is introduced into the housing.

9. The motor of claim 6, wherein:

the pump part includes a suction port through which a fluid is introduced and a discharge port which communicates with the suction port and through which the fluid introduced through the suction port is discharged;

a part of the fluid introduced through the suction port is introduced into an inner portion of the housing; and the rest of the fluid is discharged through the discharge port.

10. The motor of claim 6, wherein:

the housing includes a discharge hole through which an inner portion of the housing communicates with an outside of the housing; and a part of the fluid is introduced into the inner portion of the housing from an inner portion of the cover, fills the housing, and is discharged through the discharge hole.

* * * * *